(12) United States Patent
Agrawal et al.

(10) Patent No.: US 12,174,672 B2
(45) Date of Patent: Dec. 24, 2024

(54) METHOD AND APPARATUS TO OPTIMIZE ROLLABLE DEVICES

(71) Applicant: MOTOROLA MOBILITY LLC, Wilmington, DE (US)

(72) Inventors: Amit Kumar Agrawal, Bangalore (IN); Xiaofeng Zhu, Nanjing (CN); Sanjay Dhar, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/481,122

(22) Filed: Oct. 4, 2023

(65) Prior Publication Data
US 2024/0345630 A1   Oct. 17, 2024

Related U.S. Application Data

(63) Continuation of application No. PCT/CN2023/088017, filed on Apr. 13, 2023.

(51) Int. Cl.
*G06F 1/16*  (2006.01)
*G06F 3/01*  (2006.01)

(52) U.S. Cl.
CPC .......... *G06F 1/1652* (2013.01); *G06F 1/1624* (2013.01); *G06F 3/013* (2013.01)

(58) Field of Classification Search
CPC .... G06F 3/0487; G06F 1/1652; G06F 3/0481; G06F 9/451; G06F 2203/04803;
(Continued)

(56) References Cited

U.S. PATENT DOCUMENTS

2016/0320871 A1\*  11/2016  Li ..................... G06F 1/1652
2019/0235578 A1\*  8/2019  Zhang ................ G06F 3/0484
(Continued)

FOREIGN PATENT DOCUMENTS

| CN | 108418966 A | 8/2018 |
| CN | 108449498 A | 8/2018 |
| WO | 2022108402 A1 | 5/2022 |

OTHER PUBLICATIONS

International Search Report and Written Opinion, Patent Cooperation Treaty, International Application No. PCT/CN2023/088017, mailed Jun. 23, 2023.

*Primary Examiner* — Md Saiful A Siddiqui
(74) *Attorney, Agent, or Firm* — Isidore PLLC

(57) ABSTRACT

An electronic device, method, and computer program product enable a space saving rollable display device to extend automatically in a power efficient manner. While a blade assembly is in a retracted position, a controller of the electronic device determines whether a user notification opportunity exists based on a transition between contextual states of one of stationary and changing from unattended to attended by the user; and stowed on-body of the user changing to held by the user. In response, the controller actuates a translation mechanism to slide a blade assembly, which includes a blade and flexible display, relative to a device housing of an electronic device from a retracted position to at least a partially extended position. The actuation prepares the flexible display to present user notification(s) and generates a physical indication to a user that the user notification(s) is available to be presented when the flexible display is active.

20 Claims, 12 Drawing Sheets

(58) Field of Classification Search
CPC .... G06F 1/1624; G06F 1/3265; G06F 3/0482; G06F 3/04886; G06F 1/1677; G06F 3/14; G06F 3/0484; G06F 1/1684; G06F 3/04817

See application file for complete search history.

(56) References Cited

U.S. PATENT DOCUMENTS

| | | | | |
|---|---|---|---|---|
| 2019/0261519 | A1* | 8/2019 | Park | H05K 1/118 |
| 2022/0413620 | A1* | 12/2022 | Sachidanandam | G01S 13/06 |
| 2023/0259268 | A1* | 8/2023 | Chun | G06F 3/0481 |
| | | | | 715/781 |

* cited by examiner

METHOD AND APPARATUS TO OPTIMIZE ROLLABLE DEVICES

PRIORITY APPLICATION

This application claims priority to International Application No. PCT/CN2023/088017, filed Apr. 13, 2023, the contents of which are incorporated herein.

BACKGROUND

1. Technical Field

The present disclosure relates generally to communication devices having a sliding or translating form factor, and in particular to communication devices that have a single housing and a rollable flexible display that slides or translates.

2. Description of the Related Art

Portable electronic communication devices, especially smartphones, have become ubiquitous. People all over the world use such devices to stay connected. These devices have been designed in various mechanical configurations. A first configuration, known as a "candy bar", is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell and slider devices are relatively straight forward mechanically, they can tend to still be bulky when in the closed position due to the fact that two device housings are required. It would thus be desirable to have an improved electronic device and corresponding methods that not only provide a compact geometric form factor but that also allow for the use of a larger display surface area as well.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
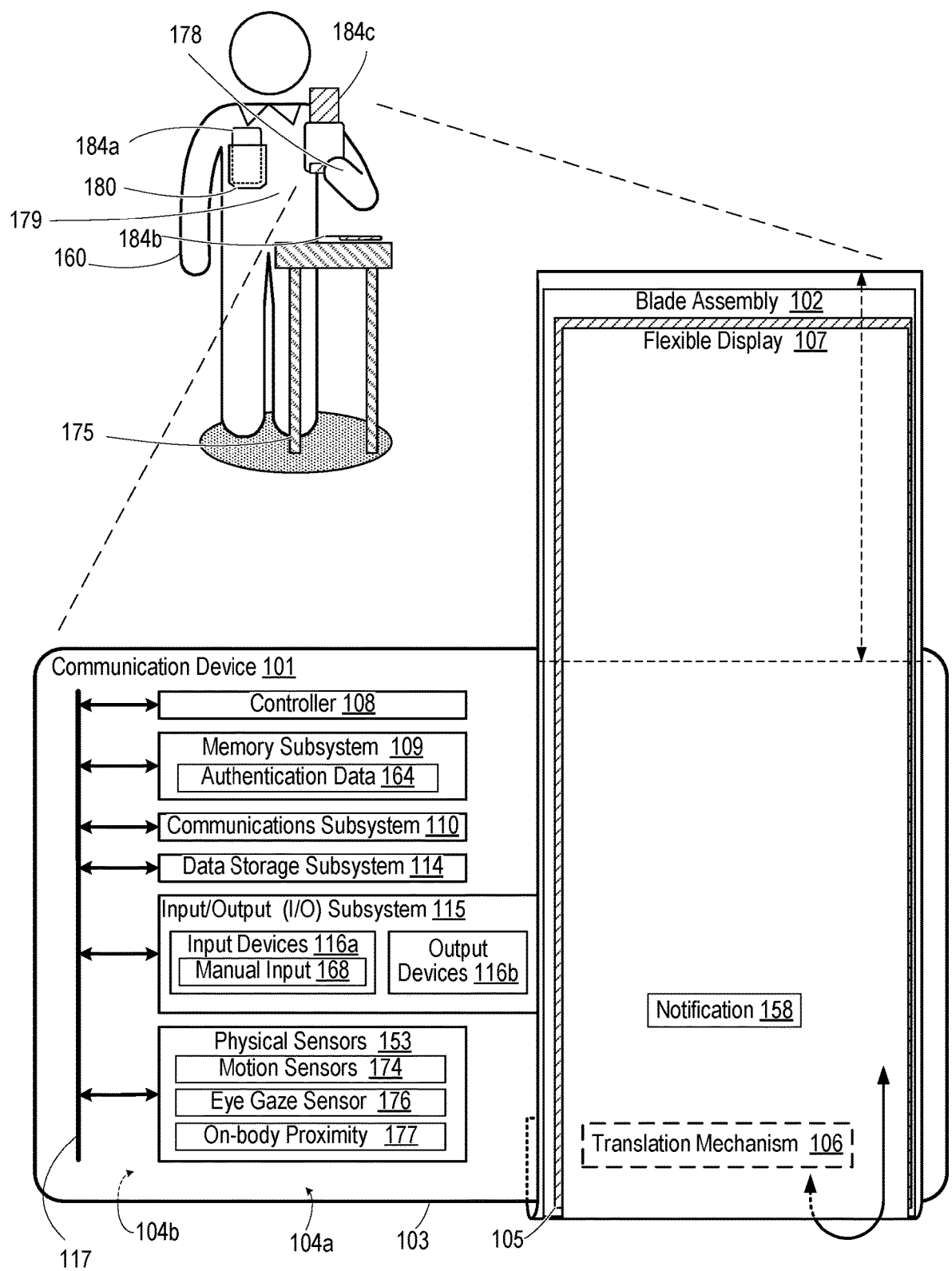
FIG. 1A depicts a simplified functional block diagram of a communication device that automatically resizes in certain detected contexts, according to one or more embodiments.

According to aspects of the present disclosure, an electronic device, a method, and a computer program product enable a rollable display device, which collapses to a small size in a retracted position for stowing, to autonomously extend a flexible display from a retracted position, in a power-efficient manner, when a user notification opportunity is detected. The electronic device includes a device housing and a blade assembly slidably coupled to the device housing and carrying a blade and a flexible display. The electronic device includes a translation mechanism operable to slide the blade assembly relative to the device housing between an extended position and a retracted position. The electronic device includes at least one sensor configured to detect a contextual state of the electronic device from among one or more of: (i) stowed on-body of a user; (ii) stationary and unattended by the user; (iii) stationary and attended by the user; and (iv) held by the user. A controller of the electronic device is communicatively coupled to the blade assembly, the translation mechanisms, and the at least one sensor. While the blade assembly is in a retracted position, the controller determines whether a user notification opportunity exists, based on a device transition between contextual states of one of: (i) stationary and changing from unattended to attended by the user; and (ii) stowed on-body of the user changing to held by the user. In response to determining that the user notification opportunity exists, the controller determines whether at least one user notification is/was generated or received while the blade assembly was in the retracted state. The controller actuates the translation mechanism to translate the blade assembly from the retracted state to at least a partially extended state for one or more of: (i) preparing the flexible display to present the at least one user notification; and (ii) generating a physical indication that at least one user notification is available to be presented when the flexible display is active.

The present disclosure provides for automatically changing display configuration in some scenarios that may include being held by a user, left in a stationary position, or stowed. In an example, when a device is in collapsed mode (i.e., the rollable display is retracted) and receives an incoming call while stowed in a pocket, the device does not automatically extend the rollable display if the device is not removed from the pocket, thus avoiding possible damage to the display and unnecessary energy consumption. However, when a user responds to the incoming call by removing the device from the pocket, the device prepares for use by automatically extending a rollable display.

In another example, the device may receive multiple notifications that would require extension of the rollable display for the notification(s) to be presented. However, if the device is left stationary on a surface and is not being viewed or held, extending the rollable display consumes power without an expectation that the user will view the multiple notifications. The present disclosure optimizes power consumption by monitoring for user notification opportunities in which an indication is detected that a user can view the notification. The device automatically extends the rollable display to prepare to present the notification. The extension alerts the user that a notification exists for viewing, which may prompt the user to unlock the display to present the notification.

In an additional example, the device detects a sudden motion of the device after being stationary or detects proximity to a user after previously not detecting proximity. The device may heuristically determine that a user notification opportunity exists in that the user is now holding the device and is ready to receive a notification. The device extends a display in preparation for presenting queued notification that require a larger display area. With automatic extension, the device presents the desirable small form factor for stowing with expedient extension when presentation on a larger display is required. Thus, the display extension is deferred until the presentation is beneficial. In another aspect of the present disclosure, the device detects when the device has been stowed in a pocket, purse or snapback and automatically collapses to reduce size and to protect an extended rollable display. Thereby, the device is prepared in the most proper form for stowing or before user use. In the latter situation of preparing for use of the device, face unlock, finger unlock, or power key press to wake up the device for operation are facilitated by automatic form changing happening in parallel while the user picks up the device. The extension saves time in preparing to present on a larger display.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A depicts a simplified functional block diagram of an electronic device, which is referenced herein as communication device 101, that automatically resizes in certain detected contexts. Communication device 101 includes controller 108, memory subsystem 109, and communications subsystem 110, data storage subsystem 114, and input/output (I/O) subsystem 115. I/O subsystem 115 has input devices 116a, output devices 116b and I/O devices such as flexible display 107. To enable management by controller 108, system interlink 117 communicatively connects controller 108 with memory subsystem 109, communications subsystem 110, data storage subsystem 114, and I/O subsystem 115. According to aspects of the present disclosure, communication device 101 includes blade assembly 102 slidably coupled to device housing 103 and carrying blade 105 and flexible display 107. Communication device 101 includes translation mechanism 106 operable to slide blade assembly 102 relative to device housing 103 between an extended position and a retracted position. In the retracted position, more of blade assembly 102 is rolled onto back side 104b of housing 103. In the extended position, more of blade of assembly 102 rolled onto front side 104a to extend beyond an opposite edge of housing 103.

Figure 2A:
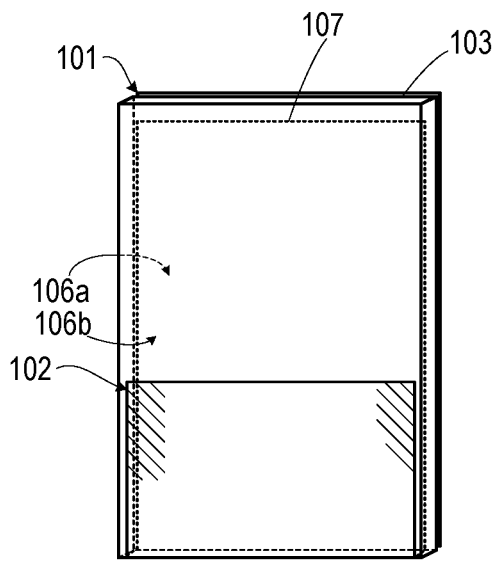
FIG. 2A depicts a back view of an example communication device having a translating blade assembly with flexible display moved to a fully retracted sliding position where the blade assembly wraps around, and abuts, a device housing of the communication device, according to one or more embodiments.
Figure 2B:
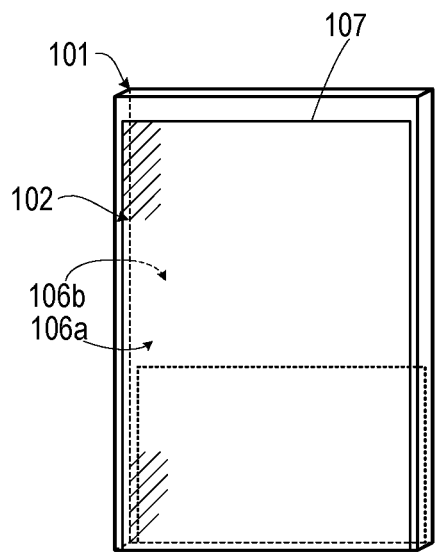
FIG. 2B depicts a front view of the example communication device of FIG. 2A with a front portion of the blade assembly not extending beyond the device housing, according to one or more embodiments.
Figure 2C:
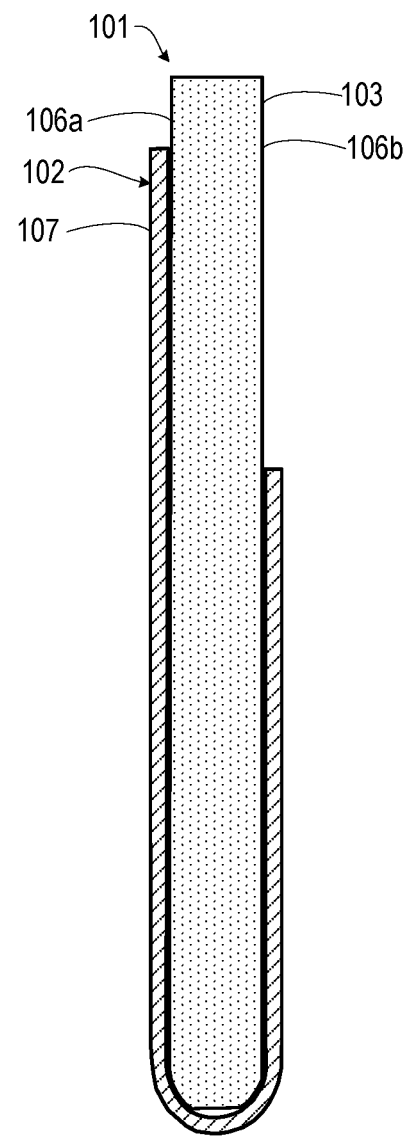
FIG. 2C depicts a side view of the example communication device of FIG. 2A with the front portion of the blade assembly not extending beyond the device housing, according to one or more embodiments.

FIG. 2A depicts a back view of communication device 101 having blade assembly 102 moved to a fully retracted sliding position. FIG. 2B depicts a front view of communication device 101 of FIG. 2A. FIG. 2C depicts a left side view of communication device 101 of FIG. 2A. With reference to FIGS. 1A and 2A-2C, when communication device 101 is in a retracted position, more of blade assembly 102 rolls around and abuts one end of device housing 103, retracted onto back side 106b of device housing 103 so that an opposite end of blade assembly 102 does not extend beyond device housing 103 on front side 104a.

Figure 3A:
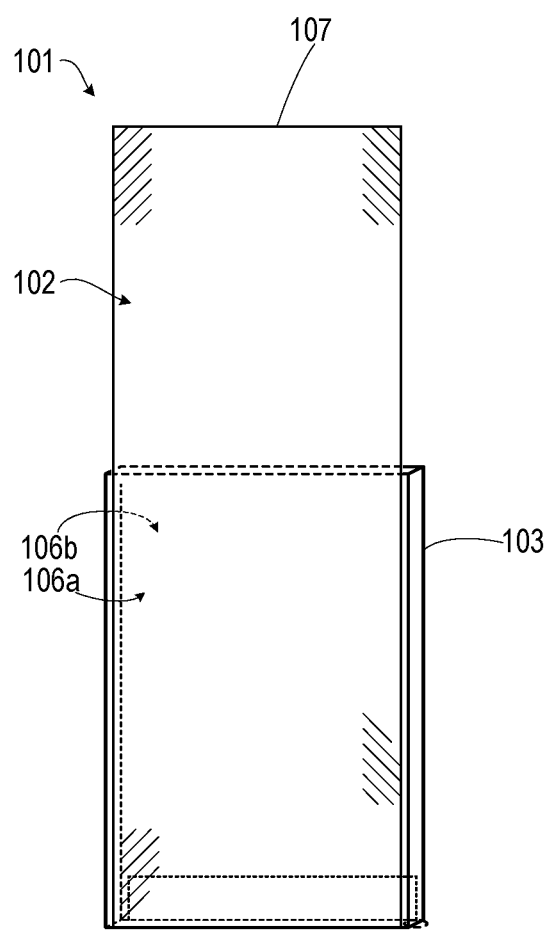
FIG. 3A depicts a front view of the example communication device having the translating blade assembly with the flexible display moved to the fully extended sliding position, where portions of the flexible display are fully extended distally away from a device housing of the communication device, according to one or more embodiments.
Figure 3B:
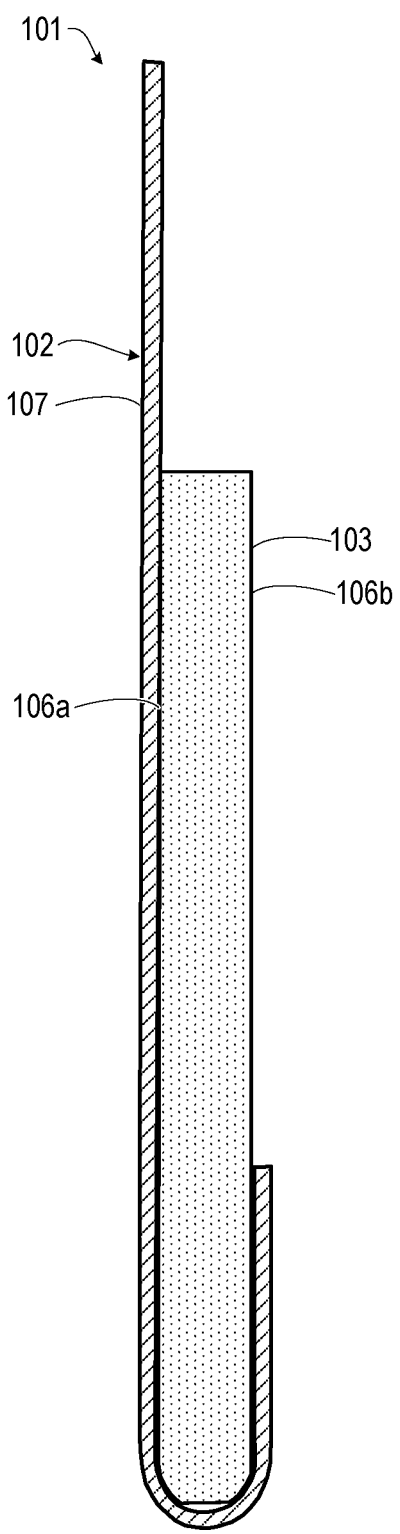
FIG. 3B depicts a side view of an example communication device of FIG. 3A with the front portion of the blade assembly extending beyond the device housing, according to one or more embodiments.

FIG. 3A is a front view of communication device 101 having blade assembly 102 moved to a fully extended sliding position. FIG. 3B depicts a left side view of communication device 101 of FIG. 3A. With reference to FIGS. 1 and 3A-3B, when communication device 101 is in an extended position, blade assembly 102 extends beyond an edge opposite to a rolling edge of front side 104a of device housing 103, increasing a display area of flexible display 107 on front side 104a. As depicted, blade assembly 102 extends upward.

With continued reference to FIG. 1A, communication device 101 includes at least one physical sensor 153 configured to detect a contextual state of communication device 101 from among one or more of: (i) stowed in pocket 180 on body 179 of user 160; (ii) stationary on a surface such as table 175 and unattended by user 160; (iii) stationary and attended by user 160; and (iv) held in hand 178 by user 160. Controller 108 of communication device 101 is communicatively coupled to blade assembly 102, translation mechanism 106, and at least one physical sensor 153. While blade assembly 102 is in a retracted position, controller 108 determines whether a user notification opportunity exists based on a transition between contextual states of one of: (i) stationary and changing from unattended to attended by user 160; (ii) stowed on-body of user 160 and changing to held by user 160; and (iii) stationary and unattended and changing to held by user 160. In response to determining that the user notification opportunity exists, controller 108 determines whether at least one user notification 158 is generated (at/by communication device) or received (from an external source) while blade assembly 102 was in the retracted state. Controller 108 actuates translation mechanism 106 to translate blade assembly 102 from the retracted state to at least a partially extended state. The extension may provide for one or more of: (i) preparing flexible display 107 to present the at least one user notification 158; and (ii) generating a physical indication that at least one user notification 158 is available to be presented when the flexible display 107 is active. With the physical indication embodiment, user 160 may be required to present a user input (e.g., fingerprint, face, passcode by touch, etc.) to compare to authentication data 164 stored in memory subsystem 109 to enable presentation of at least one user notification 158.

In one or more embodiments, the at least one physical sensor 153 includes on-body proximity sensor 177. Controller 108 determines that communication device 101 is in the contextual state of being stowed on-body of user 160 based on detecting, via on-body proximity sensor 177, proximity to user 160 while flexible display 107 is locked or inactivated. In one or more particular embodiments, controller 108 actuates translation mechanism 106 to translate blade assembly 102 to the retracted position in response to determining that communication device 101 is in the on-body stowed position while the blade assembly is at least partially in the extended position.

In one or more embodiments, the at least one physical sensor 153 includes motion sensor 174. Controller 108 determines that communication device 101 is in the contextual state of being stationary and unattended based on motion sensor 174 indicating that communication device 101 is stationary (and no other sensor indicating use of communication device 101). Controller 108 determines the contextual state of being stationary and attended-to based on motion sensor 174 indicating that communication device 101 is not moving but another sensor detecting use of one or more functions or entry of inputs via one or more I/O devices of I/O subsystem 115 of communication device 101. In one or more particular embodiments, controller 108 actuates translation mechanism 106 to translate blade assembly 102 from at least the partially extended state to the retracted state in response to determining a change in the contextual state of attended-to to unattended-to. The contextual state of attended-to is based on the communication device 101 moving, and the contextual state of unattended-to is based on the communication device 101 being stationary, with no other sensed device activity and/or user interaction with other components of I/O subsystem 115, such as manual input to physical input devices 168 or touch inputs to flexible display 107.

In one or more embodiments, the at least one physical sensor 153 includes eye gaze sensor 176. Controller 108 determines communication device 101 is in the contextual state of being stationary and unattended based on eye gaze sensor 176 not detecting an eye gaze direction of user 160 toward communication device 101. Controller 108 determines communication device 101 is in the contextual state of being stationary and attended-to based on eye gaze sensor 176 detecting an eye gaze direction of user 160 toward communication device 101. In one or more particular embodiments, controller 108 actuates translation mechanism 106 to translate blade assembly 102 from at least the partially extended state to the retracted state in response to determining a change in the contextual state of attended-to based on eye gaze direction toward communication device 101 to unattended-to based on not detecting an eye gaze direction of user 160 toward communication device 101 for a threshold period of time. With an always-on or periodic scanning mode of eye gaze sensor 176, the inverse operation can be provided, whereby controller 108 actuates translation mechanism 106 to translate blade assembly 102 from the retracted state to the at least the partially extended state in response to determining a change in the contextual state of unattended based on not detecting eye gaze direction toward communication device 101 to attended-to based on detecting an eye gaze direction of user 160 toward communication device 101 for a minimum threshold period of time.

In one or more embodiments, controller 108 actuates translation mechanism 106 to translate blade assembly 102 from the retracted state to at least a partially extended state sufficient to present the at least one user notification 158. In one or more embodiments, the at least one user notification 158 can include mobile terminated audio or video call request. In one or more embodiments, controller presents at least one user notification 158 on flexible display 107 in response to receiving a device or a display unlocking credential from user 160.

Figure 1B:
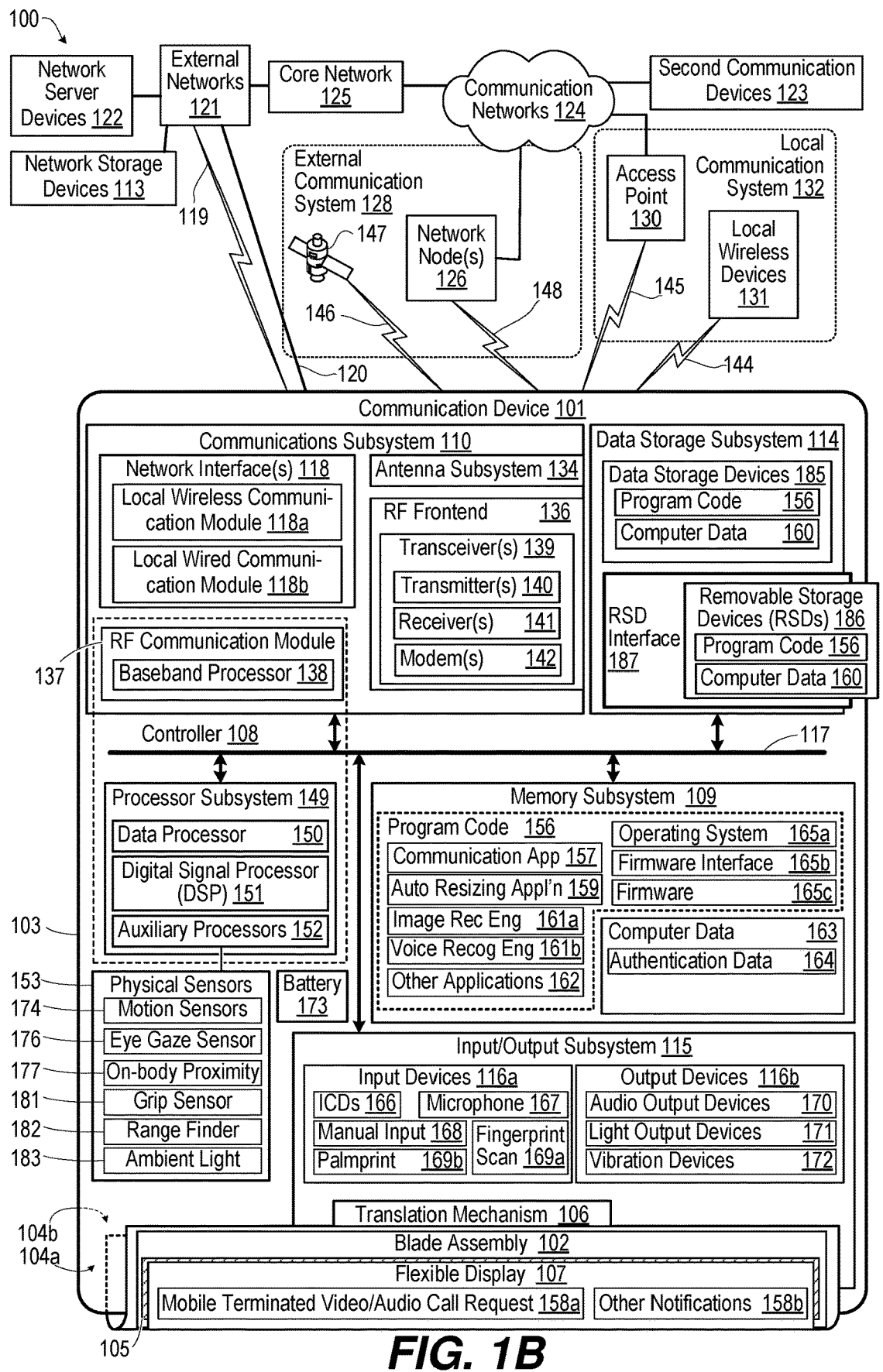
FIG. 1B depicts a functional block diagram of a communication environment including the communication device of FIG. 1A, according to one or more embodiments.

FIG. 1B is a functional block diagram of a communication environment 100 that includes communication device 101 and in which the features of the present disclosure are advantageously implemented. As an example of a rollable display device, communication device 101 has blade assembly 102 that rolls around one end of device housing 103, abutting front side 104a and a portion of back side 104b of device housing 103. Blade assembly 102 includes blade 105 that is positioned by translation mechanism 106. Blade assembly 102 includes flexible display 107 that is attached to move with blade 105.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. System interlink 117 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 117) are illustrated in FIG. 1A, it is to be understood that more, fewer, or different interconnections may be present in other embodiments.

In one or more embodiments, communications subsystem 110 may include one or more network interfaces 118, such as local wireless communication module 118a and local wired communication module 118b, to communicatively couple communication device 101 respectively via wireless connection 119 or network cable 120 to external networks 121. Communication device 101, via external networks 121, may connect to network storage devices 113 that store computer data and to network server devices 122 that facilitate access to network storage devices 113. Network server devices 122 may have identical or similar components and functionality as described above for communication device 101. Communication device 101 may communicate with second communication devices 123 via external networks 121 or via communication networks 124 that are supported by core networks 125. Network interface(s) 118 may include a network interface controller (NIC) and support one or more network communication protocols. External networks 121 can include a local area network (LAN), a campus area network (CAN), a metropolitan area network (MAN), or a wide area network (WAN). For example, wireless connection 119 and network cable 120 can be an Ethernet connection/cable.

In one or more embodiments, communications subsystem 110 may include additional functionality for communicating, using a cellular connection, with network node(s) 126 of external communication system 128 and for communicating, using a wireless connection, with wireless access point 130 or local wireless devices 131 of local communication system 132. Communications subsystem 110 includes antenna subsystem 134. Communications subsystem 110 includes radio frequency (RF) front end 136 and RF communication module 137 having baseband processor 138. RF front end 136 includes transceiver(s) 139, which includes transmitter(s) 140 and receiver(s) 141. RF front end 136 further includes modem(s) 142. Baseband processor 138 of RF communication module 137 communicates with controller 108 and RF front end 136. Baseband processor 138 operates in a baseband frequency range to encode data for transmission and decode received data, according to a communication protocol. Modem(s) 142 modulates baseband encoded data from RF communication module 137 onto a carrier signal to provide a transmit signal that is amplified by transmitter(s) 140. Modem(s) 142 demodulates each signal received using antenna subsystem 134 from external communication system 128 or local communication system 132. The received signal is amplified and filtered by receiver(s) 141, which demodulates received encoded data from a received carrier signal.

In one or more embodiments, controller 108, via communications subsystem 110, performs multiple types of cellular over-the-air (OTA) or wireless communication with local communication system 132. Communications subsystem 110 can communicate via an OTA connection 144 with local wireless devices 131. In an example, OTA connection 144 is a Bluetooth connection, or other personal access network (PAN) connection. In one or more embodiments, communications subsystem 110 communicates with one or more locally networked devices via a wireless local area network (WLAN) link 145 supported by access point 130. In one or more embodiments, access point 130 supports communication using one or more IEEE 402.11 WLAN protocols. Access point 130 is connected to communication networks 124 via a cellular or wired connection. In one or more embodiments, communications subsystem 110 receives downlink channels 146 from GPS satellites 147 to obtain geospatial location information. Communications subsystem 110 can communicate via an over-the-air (OTA) cellular connection 148 with network node(s) 126.

Controller 108 includes processor subsystem 149, which includes one or more central processing units (CPUs), depicted as data processor 150. Processor subsystem 149 can include one or more digital signal processors 151 that can be integrated with data processor 150. Processor subsystem 149 can include other processors that are communicatively coupled to data processor 150, such as baseband processors 138 of communication module 137. In another example, auxiliary processors 152 may act as a low power consumption, always-on sensor hub for physical sensors 153. In one or more embodiments that are not depicted, controller 108 can further include distributed processing and control components that are external to housing 103 or grouped with other components, such as I/O subsystem 115. Data processor 150 is communicatively coupled, via system interlink 117, to memory subsystem 109. In one or more embodiments, data processor 150 is communicatively coupled via system interlink 117 to communications subsystem 110, data storage subsystem 114 and I/O subsystem 115. Controller 108 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 109 stores program code 156 for execution by processor subsystem 149 to provide the functionality described herein. Program code 156 includes applications such as communication application 157 that generates notifications such as mobile terminated video/call request 158a or other notification 158b. Program code includes applications, including auto resizing application 159 that determines a heuristic context of communication device 101 and user 160 for controlling translation mechanism 106 that positions blade assembly 102. Program code may include applications or utilities, such as image recognition engine 161a and voice recognition engine 161b, and other applications 162. In one or more embodiments, several of the described aspects of the present disclosure are provided via executable program code of applications executed by controller 108. In one or more embodiments, program code 156 may be integrated into a distinct chipset or hardware module as firmware that operates separately from executable program code. Portions of program code 156 may be incorporated into different hardware components that operate in a distributed or collaborative manner. Implementation of program code 156 may use any known mechanism or process for doing so using integrated hardware and/or software, as known by those skilled in the art. Program code 156 may access, use, generate, modify, store, or communicate computer data 163, such as authentication data 164.

Computer data 163 may incorporate "data" that originated as raw, real-world "analog" information that consists of basic facts and figures. Computer data 163 includes different forms of data, such as numerical data, images, coding, notes, and financial data. The computer data may originate at communication device 101 or be retrieved by communication device 101. Communication device 101 may store, modify, present, or transmit computer data 163. Computer data 163 may be organized in one of a number of different data structures. Common examples of computer data 163 include video, graphics, text, and images as discussed herein. Computer data 163 can also be in other forms of flat files, databases, and other data structures.

Memory subsystem 109 further includes operating system (OS) 165a, firmware interface 165b, such as basic input/output system (BIOS) or Uniform Extensible Firmware Interface (UEFI), and firmware 165c, which may be considered to be program code 156.

I/O subsystem 115 includes input devices 116a, output devices 116b, and I/O devices, such as flexible display 107. Blade assembly 102 includes blade 105 which supports flexible display 107. Input devices 116a may include image capturing devices (ICDs) 166, microphone 167, manual input devices 168 (e.g., keys and buttons), fingerprint scanning device 169a, and palmprint scanning device 169b. Output devices 116b may include audio output devices 170, light output devices 171, and vibration device 172. Vibration device 172 oscillates a mass such as battery 173 to create vibratory alerts.

Physical sensors 153 provides additional contextual indications of the use and environment of communication device 101. Examples of physical sensors 153 include motion sensors 174 or motion detectors such as accelerometers that detect when communication device 101 is being moved by user 160 or is stationary on a surface, such as table 175. Physical sensors 153 may include eye gaze sensor 176 that detects whether user 160 is looking toward communication device 101. Physical sensors 153 may include on-body proximity sensors 177 that detects proximity to a lossy dielectric mass (i.e., hand 178 or body 179 of user 160), such as when communication device 101 is placed in pocket 180. Physical sensors 153 may include grip sensors 181 exteriorly presented on housing 103 detecting when communication device 101 is being held in hand 178 of user 160. Physical sensors 153 may include range finder 182 and ambient light sensor 183. Controller 108 automatically responds to contexts, determined at least in part on physical sensors 153, by positioning blade assembly 102 of communication device 101 in one configuration from among: (i) a retracted configuration 184a when communication device 101 is stowed in pocket 180, (ii) a partially extended peek configuration 184b when a notification 158 (FIG. 1A) is received, or (iii) an extended configuration 184c when communication device 101 is in hand 178 of user 160 or when a larger display output is required for presenting content.

Data storage subsystem 114 of communication device 101 includes data storage device(s) 185. Controller 108 is communicatively connected, via system interlink 117, to data storage device(s) 185. Data storage subsystem 114 provides program code 156 and computer data 163 stored on nonvolatile storage that is accessible by controller 108. For example, data storage subsystem 114 can provide a selection of program code 156 and computer data 163. These applications can be loaded into memory subsystem 109 for execution/processing by controller 108. In one or more embodiments, data storage device(s) 185 can include hard disk drives (HDDs), optical disk drives, and/or solid-state drives (SSDs), etc. Data storage subsystem 114 of communication device 101 can include removable storage device(s) (RSD(s)) 186, which is received in RSD interface 187. Controller 108 is communicatively connected to RSD 186, via system interlink 117 and RSD interface 187. In one or more embodiments, RSD 186 is a non-transitory computer program product or computer readable storage device. Controller 108 can access data storage device(s) 185 or RSD 186 to provision communication device 101 with program code, such as program code 156.

Figure 4:
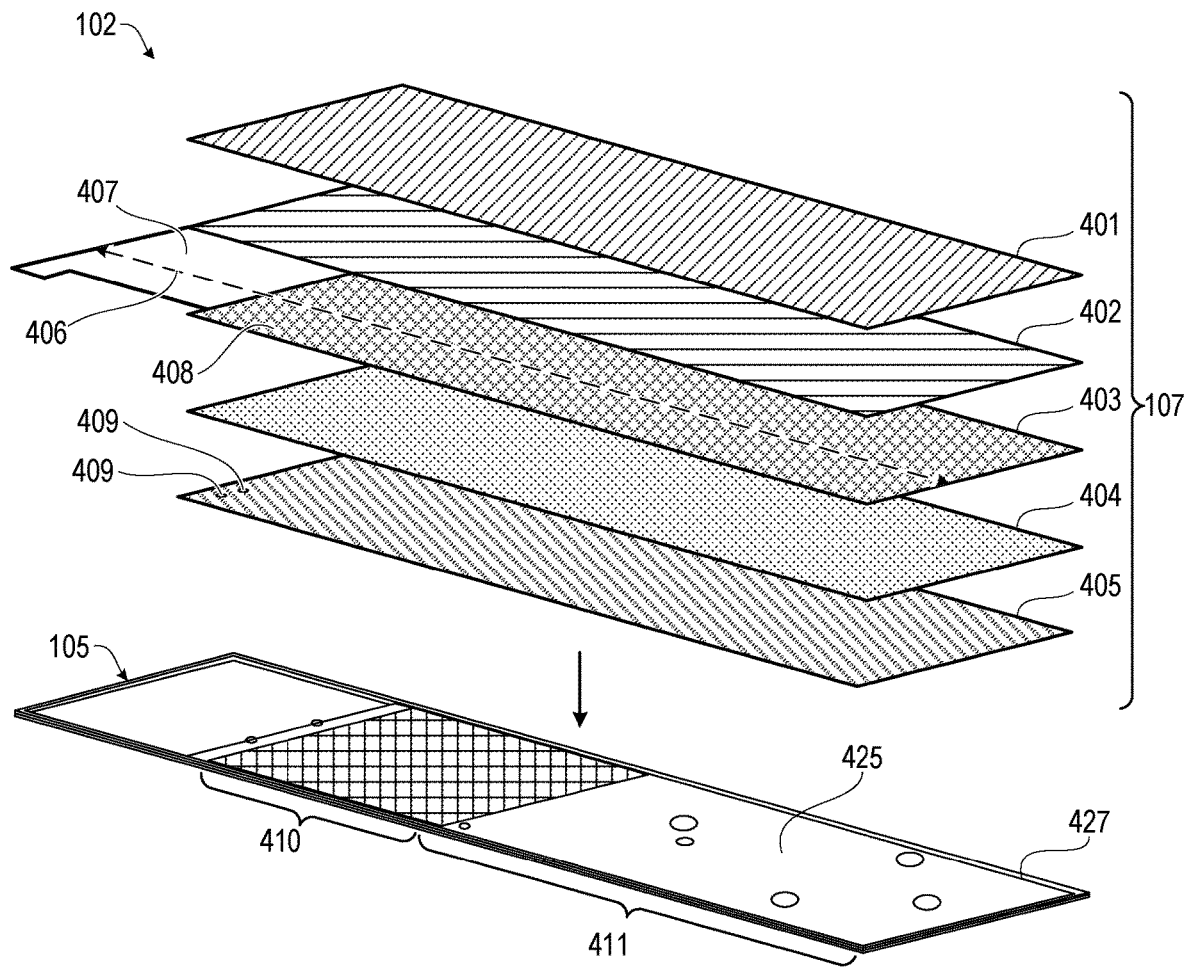
FIG. 4 depicts a blade assembly with a blade and with a flexible display in an exploded view, according to one or more embodiments.

FIG. 4 illustrates blade assembly 102 with blade 105 and with flexible display 107 in an exploded view. In one or more embodiments, flexible display 107 includes one or more layers that are coupled or laminated together to complete flexible display 107. In an example, flexible display 107 includes flexible protective cover 401, first adhesive layer 402, flexible display layer 403, second adhesive layer 404, and flexible substrate 405. Beginning from the top of the layer stack opposite to blade 105, in one or more embodiments, flexible protective cover 401 includes an optically transparent substrate such as a thin film sheet of a thermoplastic material. In an example, flexible protective cover 401 is manufactured from a layer of optically transparent polyamide or polycarbonate having a thickness of about eighty microns. Flexible protective cover 401 may function as a fascia by defining a cover for flexible display layer 403. In one or more embodiments, flexible protective cover 401 is optically transparent, in that light can pass through the flexible protective cover 401 so that objects behind flexible protective cover 401 can be distinctly seen. Flexible protective cover 401 may optionally include an ultra-violet barrier. Such a barrier can be useful in improving the visibility of flexible display layer 403.

Beneath flexible protective cover 401 is first adhesive layer 402. In one or more embodiments, first adhesive layer 402 is an optically transparent adhesive. The optically transparent adhesive can be applied to two sides of a thin, optically transparent substrate such that the first adhesive layer 402 functions as an optically transparent layer having optically transparent adhesive on both sides. Where so configured as "double-sided tape", first adhesive layer 402 may have a thickness of about fifty microns that can then be spooled and applied between, to couple together, flexible protective cover 401 and flexible display layer 403. In other embodiments, first adhesive layer 402 may be applied between flexible protective cover 401 and the display layer 403 as an optically transparent liquid or gel that is allowed to cure or optionally cured by heat, ultraviolet light, or other techniques. First adhesive layer 402 mechanically couples flexible display layer 403 to flexible protective cover 401.

In one or more embodiments, flexible display layer 403 is situated between flexible substrate 405 and flexible protective cover 401. Flexible display layer 403 includes image producing portion 407 having a same length and width, and aligned with, flexible protective cover 401 and flexible substrate 405. In one or more embodiments, flexible display layer 403 includes T-shaped tongue 408 attached along major axis 406 of flexible display layer 403. Blade 105 is sized to receive flexible display layer 403 attached to T-shaped tongue 408. In one or more embodiments, electronic circuit components configured to operate image producing portion 407 of the flexible display layer 403, connectors, and other components can be coupled to this T-shaped tongue 408 and further coupled to image producing portion 407 of flexible display 107. For instance, as shown in FIG. 4, flexible display layer 403 includes a T-shaped tongue 408 that extends beyond image producing portion 407 of flexible display layer 403 and other layers (401, 402, 404, and 405) of flexible display 107. While T-shaped tongue 408 is T-shaped in this illustrative embodiment, T-shaped tongue 408 can take other shapes.

Flexible display layer 403 optionally may be touch-sensitive. In one or more embodiments, flexible display layer 403 is an organic light emitting diode (OLED) display layer. When coupled to flexible substrate 405, flexible display layer 403 can bend in accordance with various bending radii. For example, some embodiments allow bending radii of between thirty and six hundred millimeters. Other substrates allow bending radii of around five millimeters to provide a display that is foldable through active bending. Other configurations of flexible display 107 may accommodate both bends and folds. In one or more embodiments, flexible display layer 403 may be formed from multiple layers of flexible material such as flexible sheets of polymer or other materials. Flexible display layer 403 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 403 has a thickness of about 130 microns.

In one or more embodiments, to be touch sensitive, flexible display layer 403 includes a layer including one or more optically transparent electrodes. In one or more embodiments, flexible display layer 403 includes an organic light emitting diode layer configured to present images and other information to user 160 (FIG. 1A). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 403. In one or more embodiments, flexible substrate 405 includes a thin layer of steel having a thickness of about thirty microns. In one or more embodiments, flexible substrate 405 includes a thin layer of thermoplastic material.

In one or more embodiments, flexible display layer 403 is coupled to flexible substrate 405 by second adhesive layer 404. In one or more embodiments, second adhesive layer 404 is identical to the first adhesive layer 402 and includes an optically transparent adhesive. However, since second adhesive layer 404 is coupled between flexible display layer 403 and the flexible substrate 405, i.e., under the flexible display layer 403, an optically transparent adhesive is not a requirement. Second adhesive layer 404 may be partially optically transparent or not optically transparent. Regardless of whether second adhesive layer 404 is optically transparent, in one or more embodiments, adhesive of the second adhesive layer 404 is applied to two sides of a thin, flexible substrate. Where so configured, in one or more embodiments, second adhesive layer 404 has a thickness of about fifty microns. This extremely thin version of "double-sided tape" can then be spooled and applied between, to couple together flexible display layer 403 and flexible substrate 405. In other embodiments, as with first adhesive layer 402, second adhesive layer 404 may instead be applied between flexible display layer 403 and flexible substrate as a liquid or gel that is passively cured or that is actively cured by heat, ultraviolet light, or other techniques.

In other embodiments, a layer (401-402) above flexible display layer 403 may be configured with enough stiffness to make the flexible substrate 405 unnecessary. In an example, flexible protective cover 401 is configured with enough stiffness to provide sufficient protection for flexible display 107 during bending, enabling flexible substrate 405 to be omitted.

Flexible display 107 is supported by flexible substrate 405 and by blade 105 having blade substrate 425. In one or more embodiments, blade substrate 425 includes a layer of steel. In one or more embodiments, blade substrate 425 is thicker than flexible substrate 405. In an example, flexible substrate 405 includes a steel layer with a thickness of about thirty microns and blade substrate 425 includes a layer of steel having a thickness of about one hundred microns. In one or more embodiments, blade substrate 425 is a rigid, substantially planar support layer. In an example, blade substrate 425 may be manufactured from stainless steel, from a thin, rigid thermoplastic sheet, or from nitinol material, which is a nickel-titanium alloy.

In one or more embodiments, the flexible substrate 405 is slightly longer along a major axis of the flexible substrate 405 than is the image producing portion 407 of the flexible display 107. Since the T-shaped tongue 408 is T-shaped, this allows one or more apertures 409 to be exposed on either side of the base of the T of the T-shaped tongue 408. As will be described in more detail below, this extra length along the major axis provided by the flexible substrate 405 allows one or more fasteners to rigidly couple the first end of the flexible substrate 405 to a tensioner.

Embodiments of the disclosure contemplate that some of the layers comprising the flexible display 107 are stiffer than others. Similarly, other layers of the flexible display 107 are softer than others. For example, where the flexible substrate 405 is manufactured from a metal, one example of which is stainless steel, this layer is stiffer than either the first adhesive layer 402 or the second adhesive layer 404. In one or more embodiments, the stainless steel is stiffer than the flexible display layer 403 as well. In one or more embodiments, the flexible substrate 405 is the stiffest layer in the flexible display 107, while the first adhesive layer and the second adhesive layer 404 are the softest layers of the flexible display 107. The flexible protective cover 401 and the flexible display layer 403 have a stiffness that falls between that of the flexible substrate 405 and the adhesive layers in one or more embodiments.

In one or more embodiments, the various layers of the flexible display 107 are laminated together in a substantially planar configuration. Said differently, in one or more embodiments the flexible substrate 405 is configured as a substantially planar substrate. The second adhesive layer 404 can be attached to this substantially planar substrate, with the flexible display layer 403 then attached to the second adhesive layer 404. The first adhesive layer 402 can be attached to the flexible display layer 403, with the flexible protective cover 401 attached to the first adhesive layer 402. To ensure proper coupling, flexible display layer 403 can be cured, such as in an autoclave at a predefined temperature for a predefined duration. Where employed, such curing allows any air bubbles or other imperfections in the various layers to be corrected. In one or more embodiments, flexible substrate 405 is configured as a substantially planar substrate resulting in flexible display 107 being substantially planar.

In one or more embodiments, blade substrate 425 of blade 105 includes both flexible portion 410 and rigid portion 411. Flexible portion 410 is positioned to encounter bending in translation of blade assembly 102 from the retracted position to the extended position. Rigid portion 411 is positioned to remain on front side 106a of device housing 103 (FIG. 1A) during translation. In the extended position, rigid portion 411 extends beyond front side 106a of device housing 103 (FIGS. 3A-3B). In an example, blade substrate 425 is manufactured from a metal such as steel having a thickness of one hundred microns that provides rigidity to rigid portion 411.

In one or more embodiments, blade 105 includes silicone border 427 positioned around a perimeter of blade substrate 425 to protect the edges of flexible display 107 when attached to blade substrate 425 of blade 105. In one or more embodiments, silicone border 427 is co-molded around the perimeter of blade substrate 425.

In one or more embodiments, rigid portion 411 of blade substrate 425 can define one or more apertures. These apertures can be used for a variety of purposes. In an example, some of the apertures can be used to rigidly fasten blade 105 to translation mechanism 106 (FIG. 1A), such as a display roller mechanism. Additionally, some of the apertures can contain magnets. Hall-effect sensors positioned in device housing 103 (FIG. 1A) to which blade assembly 102 is coupled can then detect the positions of these magnets such that controller 108 (FIG. 1A) can determine whether blade assembly 102 including flexible display 107 are in the extended position, the retracted position, the peek position, or an intermediate position.

In one or more embodiments, flexible display 107 is coupled to blade substrate 425 of blade 105 within the confines of silicone border 427. In an example, a first end of flexible display 107 is adhesively coupled to rigid portion 411 of blade substrate 425 of blade 105. The other end of flexible display 107 may be rigidly coupled to a tensioner by passing fasteners through apertures 409 of flexible substrate 405.

Figure 5:
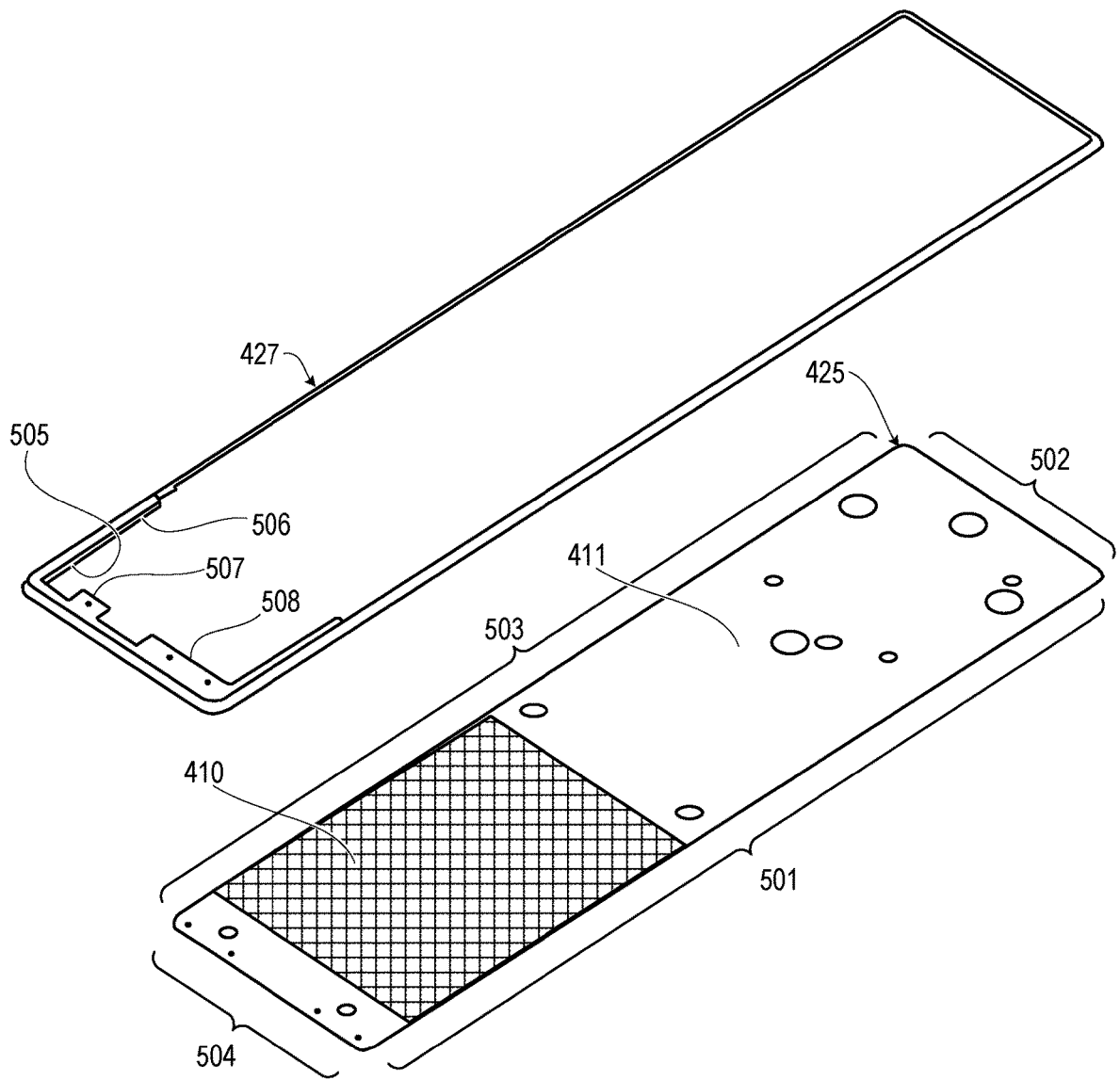
FIG. 5 depicts a blade substrate and a silicone border in an exploded view, according to one or more embodiments.

FIG. 5 depicts blade substrate 425 and silicone border 427 shown in an exploded view. Silicone border 427 defines a singular, contiguous, unitary piece of silicone. In the illustrative embodiment of FIG. 5, silicone border 427 surrounds three sides 501, 502, and 503 of blade substrate 425, and extends beyond minor side 504 to define receiving recess 505 that can accommodate mechanical and electrical components such as electronic circuit components to provide power and control for flexible display 107 (FIG. 4) that will situate within the perimeter defined by silicone border 427. A tensioner may keep flexible display 107 (FIG. 4) flat across flexible portion 410 of blade substrate 425, flexible circuits, and other components. In one or more embodiments, portions 506, 507, 508 of silicone border 427 extending beyond minor side 504 of blade substrate 425 surrounding receiving recess 505 are thicker than are the other portions of silicone border 427 that will surround flexible display 107 (FIG. 4), enabling components to be placed within receiving recess 505.

Figure 6:
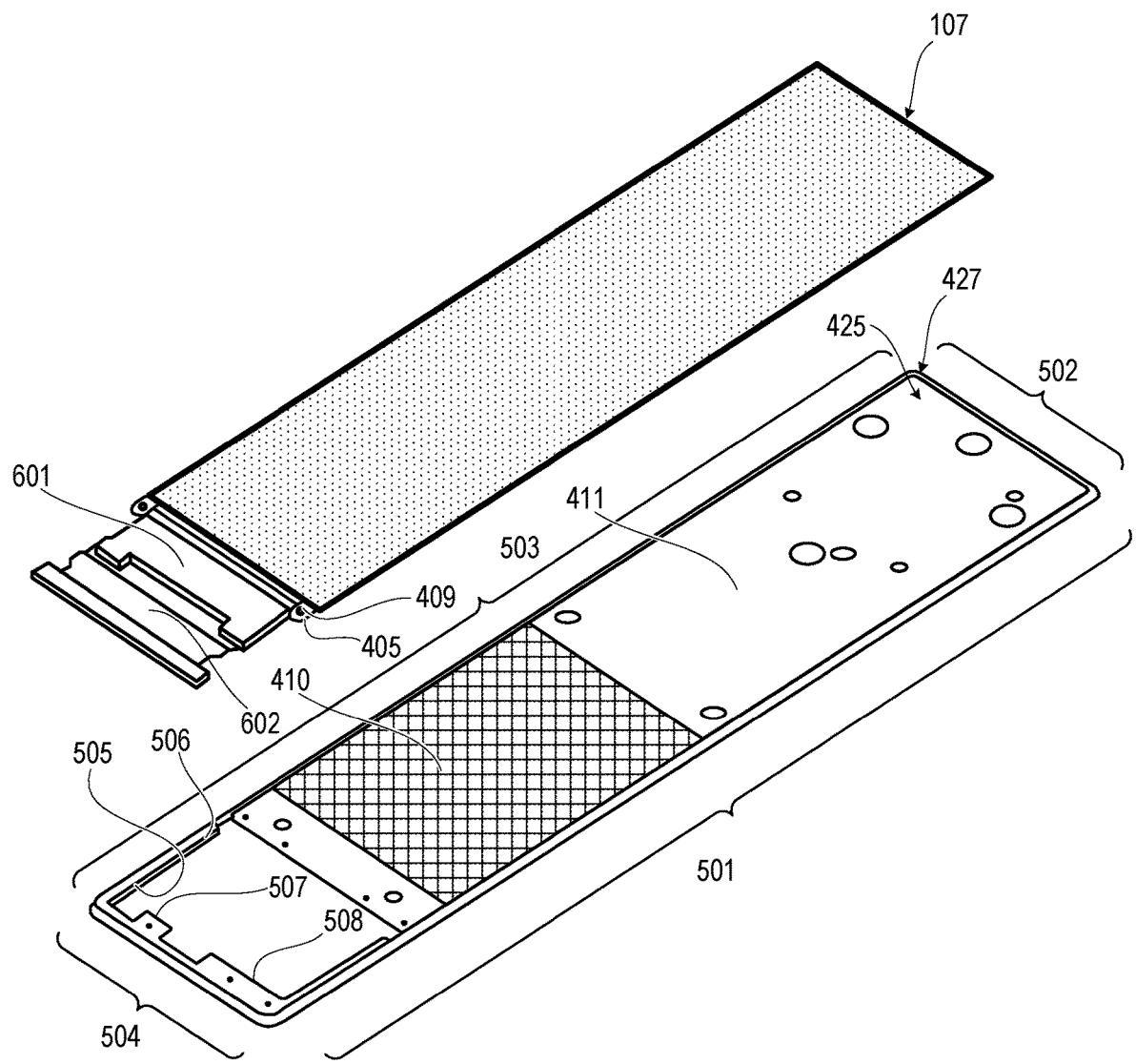
FIG. 6 depicts the flexible display and the blade with silicone border over-molded on the blade substrate, according to one or more embodiments.

FIG. 6 depicts flexible display 107 and blade 105 with silicone border 427 over-molded on blade substrate 425. Silicone border 427 surrounds three sides 501, 502, and 503 of blade substrate 425 and extends beyond minor side 504 to define receiving recess 505 that can accommodate mechanical and electrical components. Electronic circuits 601 that are operable to provide power and control for flexible display 107 have been coupled to T-shaped tongue 408 of flexible display layer 403 (FIG. 4). Additionally, mechanical connector 602 has been connected to the top of the T on T-shaped tongue 408. Flexible substrate 405 extends beyond a distal end of flexible display layer 403 (FIG. 4) so that apertures 409 defined therein can be coupled to a tensioner to ensure that flexible display 107 stays flat around flexible portion 410 of blade substrate 425 when flexible portion 410 of blade substrate 425 passes around a rotor positioned at the end of device housing 103 (FIG. 1A).

In one or more embodiments, blade 105 can be fixedly coupled to flexible display 107. In an example, flexible display 107 is coupled to rigid portion 411 by an adhesive or other coupling mechanism. A tensioner can then be positioned in receiving recess 505. In one or more embodiments, the tensioner rigidly couples with fasteners to the apertures 409 (FIG. 4) of flexible substrate 405 (FIG. 4) to keep flexible display 107 flat across flexible portion 410, regardless of how flexible portion 410 is being bent around the minor surface of device housing 103 or a corresponding rotor.

Figure 7:
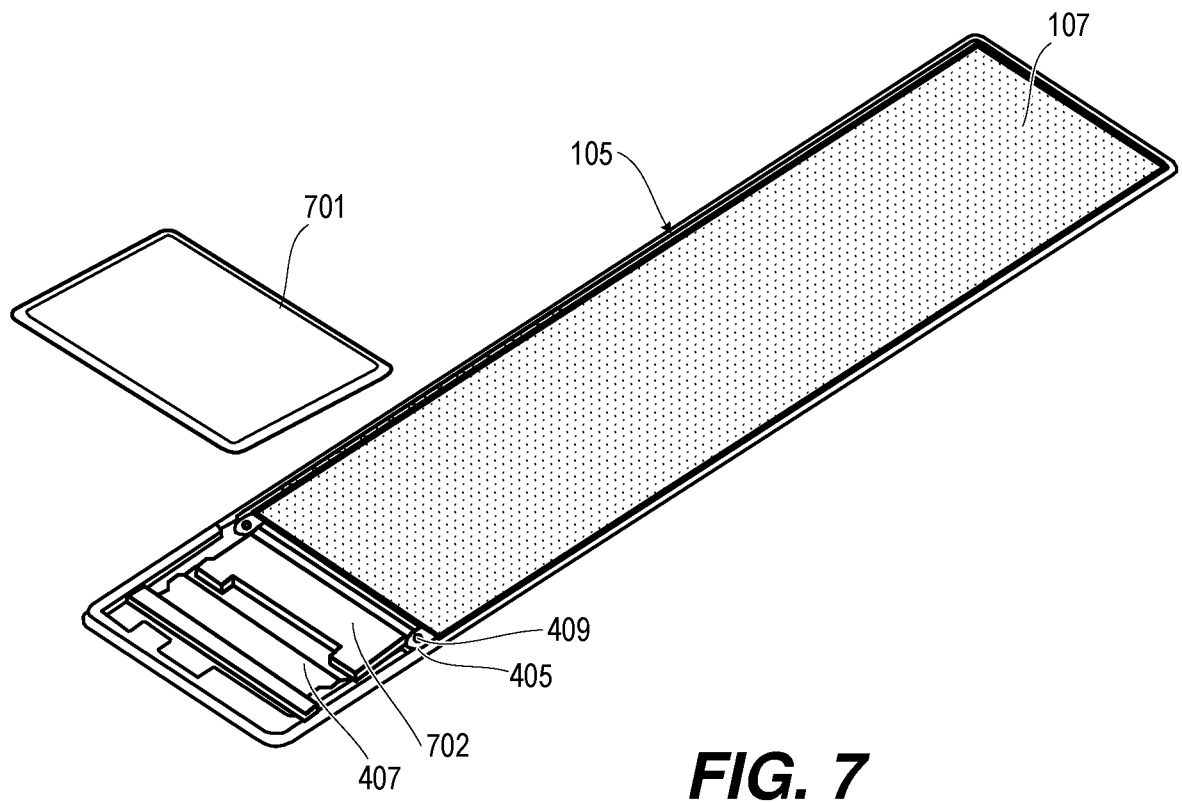
FIG. 7 depicts the flexible display after being coupled to the blade surrounded by a silicone border, according to one or more embodiments.
Figure 8:
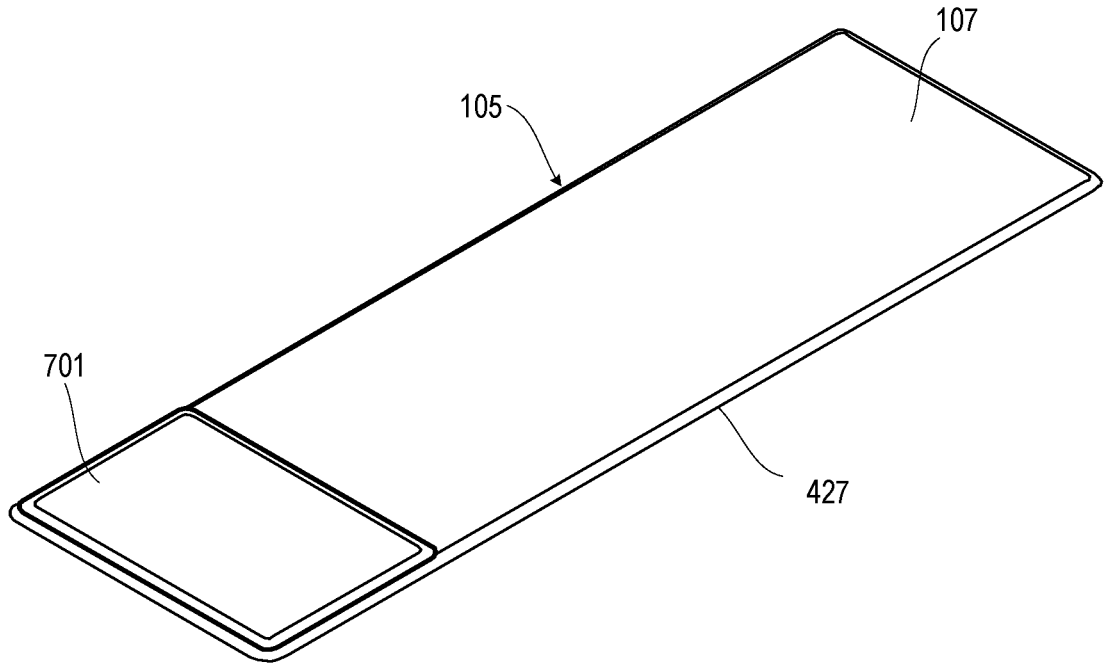
FIG. 8 depicts the blade assembly completely configured with a cover and in an unrolled state, according to one or more embodiments.

FIG. 7 depicts flexible display 107 after being coupled to blade 105. Silicone border 427 surrounds the flexible display 107, with silicone border 427 surrounding and abutting three sides of the flexible display layer (403). A flexible substrate is then connected to the electronic circuits 601 carried by the T-shaped tongue 408. Additionally, a tensioner can be coupled to the flexible substrate 405. Thereafter, cover 701 is attached to silicone border 427 atop the electronic circuits 702 and other components situated on or around the T-shaped tongue 408. This portion of blade assembly 102 where the components are stored beneath cover 701 may be referred to as the "backpack." FIG. 8 depicts blade assembly 102 completely configured with cover 701.

Figure 9:
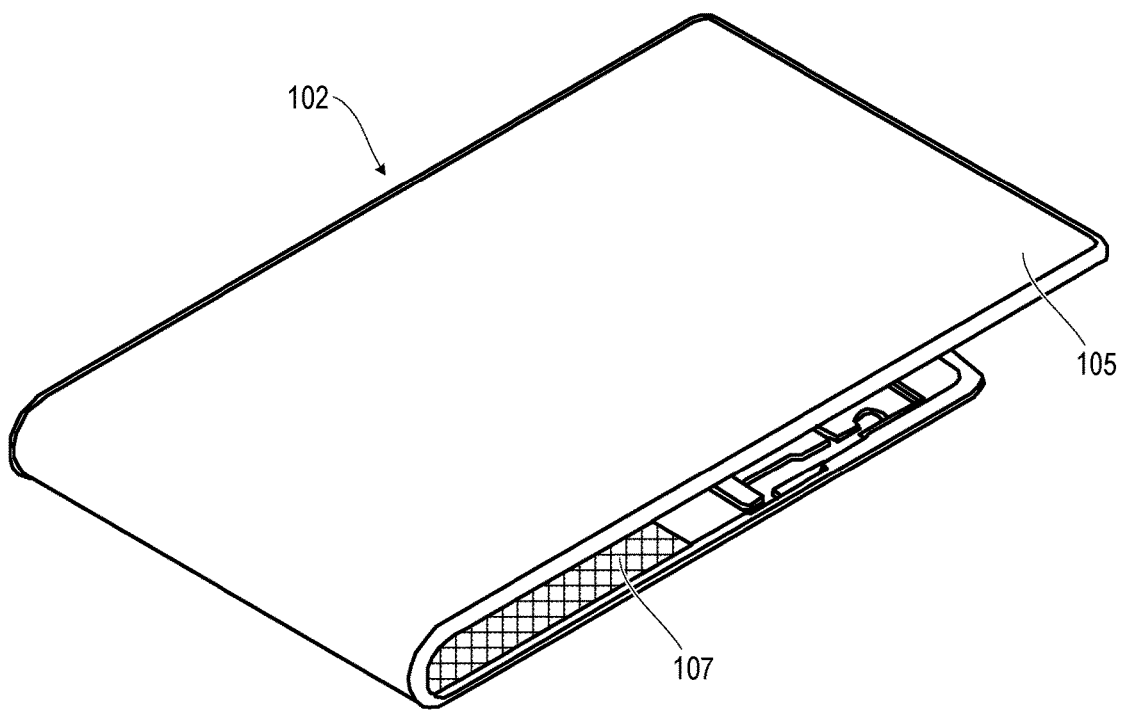
FIG. 9 depicts the blade assembly in a fully retracted state, according to one or more embodiments.
Figure 10:
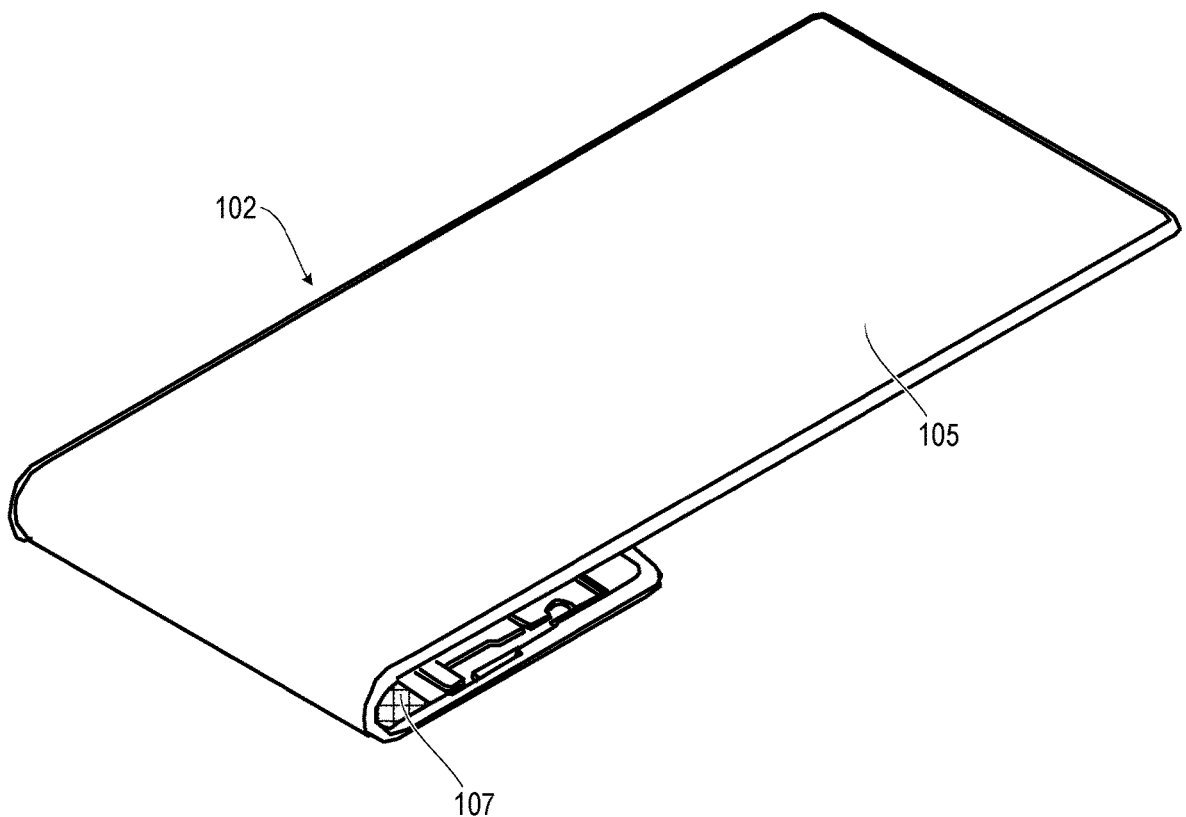
FIG. 10 depicts the blade assembly in a fully extended state, according to one or more embodiments.

FIG. 9 depicts blade assembly 102 in a fully retracted state. FIG. 10 depicts blade assembly 102 in a fully extended state. In one or more embodiments, flexible display 107 and blade 105 are configured to wrap around a minor surface of device housing 103 (FIG. 1A) where a display roller mechanism is situated. In one or more embodiments, the display roller mechanism includes a rotor that is positioned within a curvilinear section of flexible display 107 and blade 105. When placed within device housing 103 (FIG. 1A), translation of translation mechanism 106 (FIG. 1A) causes translation of blade assembly 102, which in turn causes rotation of the rotor. The result is a linear translation of the flexible display 107 and blade 105 across a translation surface of device housing 103 (FIG. 1A) by drawing flexible display 107 and the blade 105 around the rotor. As previously described, blade substrate 425 (FIG. 4) of blade assembly 102 includes flexible portion 410 (FIG. 4) that allows blade 105 and flexible display 107 to deform around device housing 103 (FIG. 1A), corresponding to the respective points of rolling depicted in FIGS. 9-10.

Figure 11:
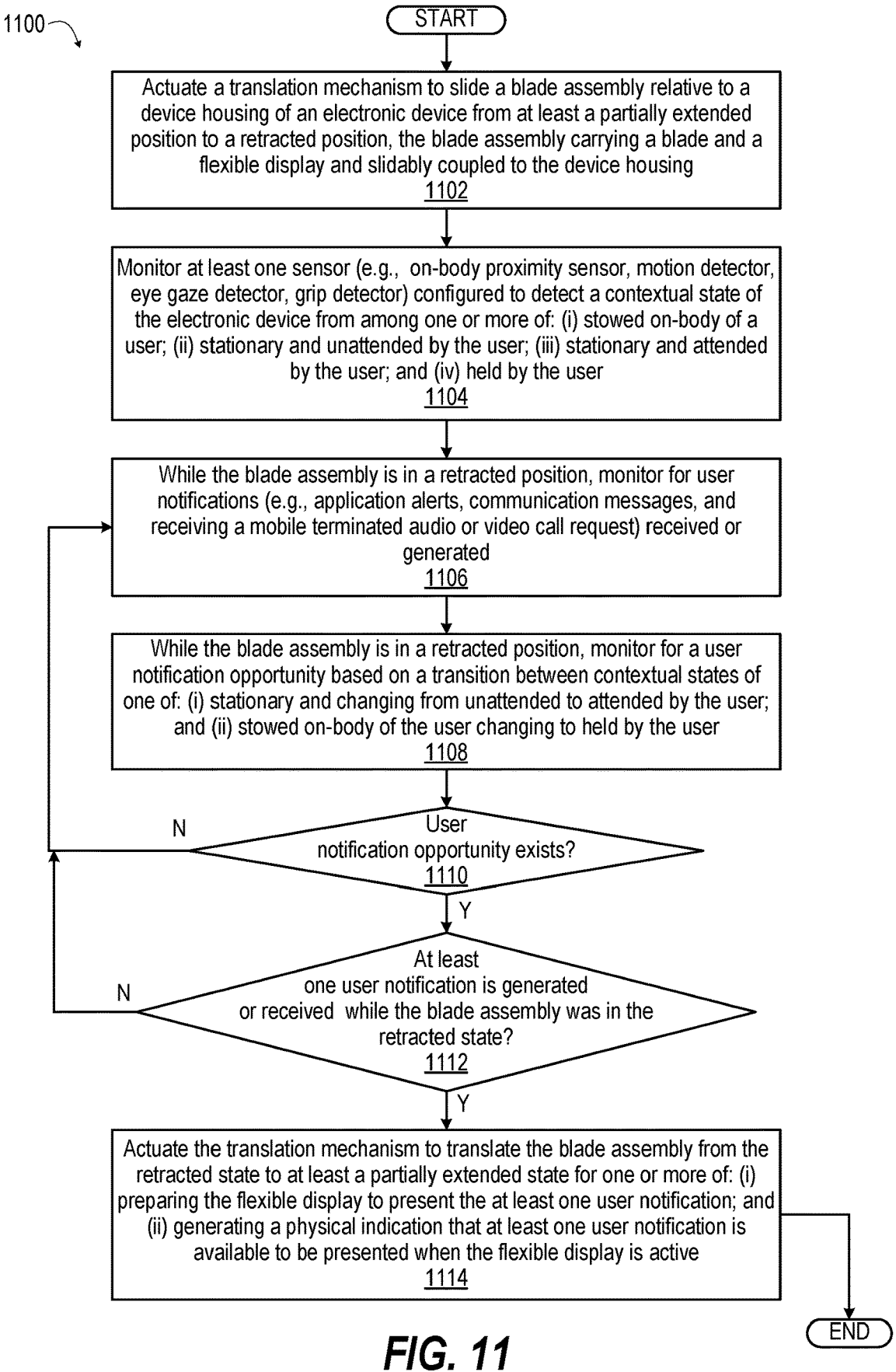
FIG. 11 is a flow diagram presenting a method of extending the rollable flexible display in response to detecting a user notification opportunity, according to one or more embodiments.
Figure 12:
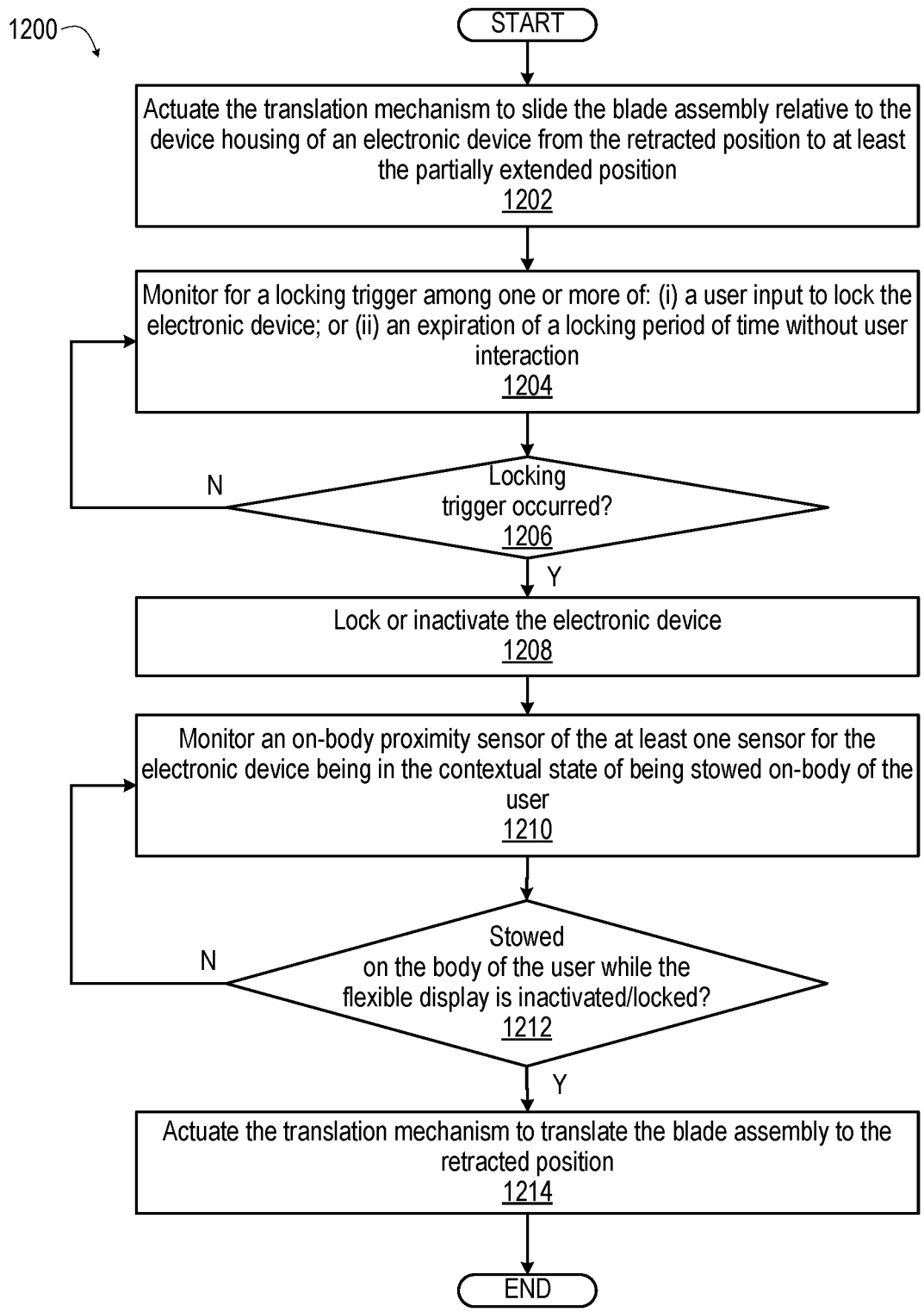
FIG. 12 is a flow diagram presenting a method of automatically resizing a rollable flexible display when the communication device is detected as stowed, according to one or more embodiments.
Figure 13:
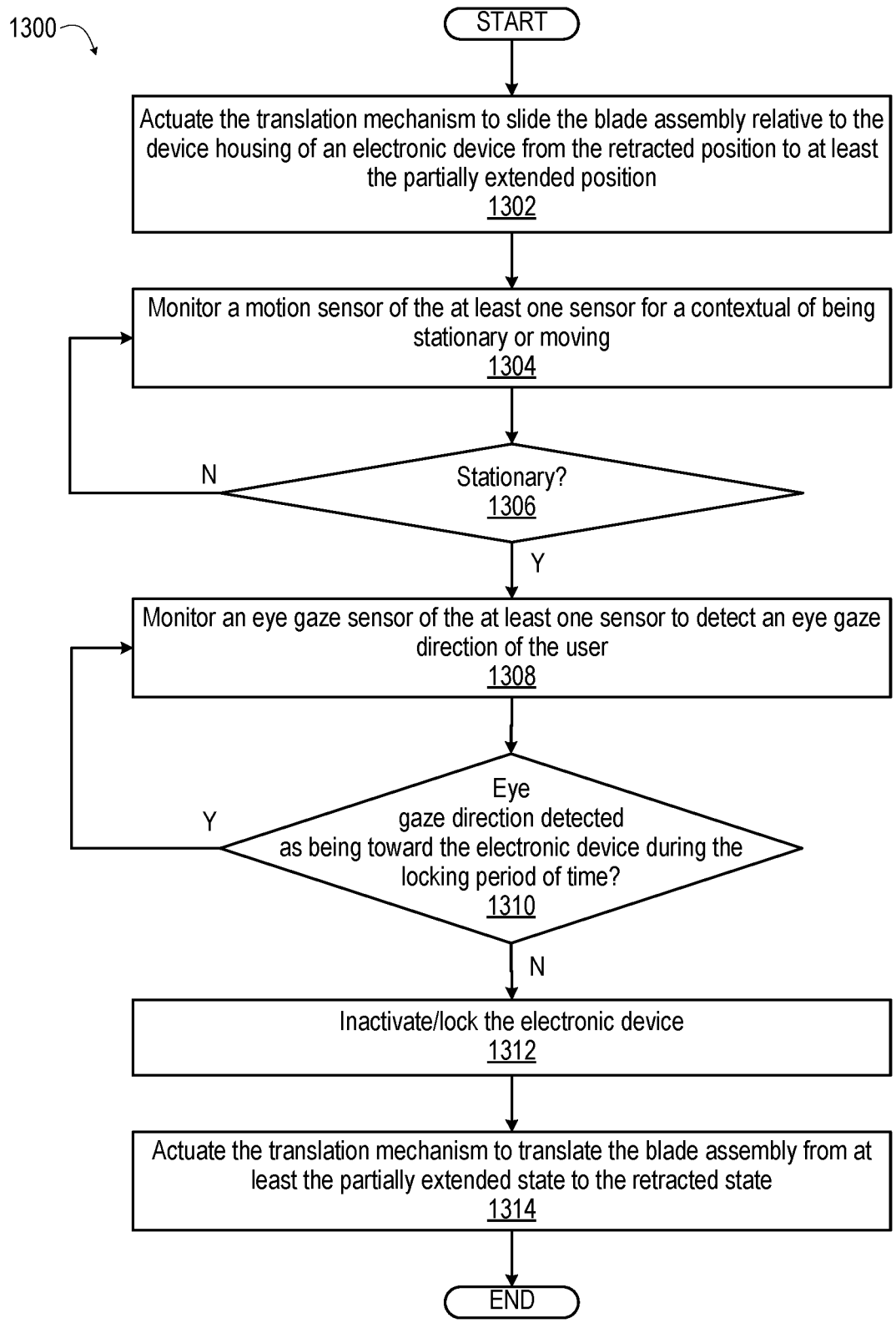
FIG. 13 is a flow diagram presenting a method of automatically resizing a rollable flexible display to a retracted position when the device is detected as unattended.

FIG. 11 is a flow diagram presenting method 1100 of extending the rollable flexible display in response detecting a user notification opportunity. FIG. 12 is a flow diagram presenting method 1200 of automatically translating a rollable flexible display to a retracted position when the communication device is detected as stowed or left stationary and unattended based on one or more sensors. Operation of method 1200 is one example of the electronic device being reconfigured to the retracted state, specifically by retracting the flexible display, as a precursor to operation of method 1100 (FIG. 11). FIG. 13 is a flow diagram presenting method 1300 of automatically resizing a rollable flexible display to a retracted position when detected as being unattended. Operation of method 1300 is another example of the electronic device being reconfigured to the retracted state as a precursor to operation of method 1100 (FIG. 11). The descriptions of method 1100 (FIG. 11), method 1200 (FIG. 12), and method 1300 (FIG. 13) arc provided with general reference to the specific components illustrated within the preceding FIGS. 1, 2A-2C, and 3-10. Specific components referenced in method 1100 (FIG. 11), method 1200 (FIG. 12), and method 1300 (FIG. 13) may be identical or similar to components of the same name used in describing preceding FIGS. 1, 2A-2C, and 3-10. In one or more embodiments, controller 108 (FIG. 1A) configures communication device 101 (FIG. 1A) to provide the described functionality of method 1100 (FIG. 11), method 1200 (FIG. 12), and method 1300 (FIG. 13).

With reference to FIG. 11, method 1100 includes actuating a translation mechanism to slide a blade assembly relative to a device housing of an electronic device from at least a partially extended position to a retracted position, the blade assembly carrying a blade and a flexible display and slidably coupled to the device housing (block 1102). Being in the retracted position is a precondition for aspects of method 1100 for determining when automatic extension is triggered. At block 1104, method 1100 includes monitoring at least one sensor (e.g., on-body proximity sensor, motion detector, eye gaze detector, grip detector) configured to detect a contextual state of the electronic device from among one or more of: (i) stowed on-body of a user; (ii) stationary and unattended by the user; (iii) stationary and attended by the user; and (iv) held by the user. While the blade assembly is in a retracted position, method 1100 includes monitoring for user notifications (e.g., application alerts, communication messages, and receiving a mobile terminated audio or video call request) that are received by or generated at/by the communication device (block 1106). While the blade assembly is in a retracted position, method 1100 includes monitoring for a user notification opportunity based on a transition between contextual states of one of: (i) stationary and changing from unattended to attended by the user; and (ii) stowed on-body of the user changing to held by the user (block 1108). Method 1100 includes determining whether a user notification opportunity exists (decision block 1110). In response to determining that a user notification opportunity does not exist, method 1100 returns to block 1108. In response to determining that a user notification opportunity exists, method 1100 includes determining whether at least one notification is generated or received while blade assembly was in the retracted state (decision block 1112). In response to determining that no user notification was received or generated, method 1100 returns to block 1108. In response to determining that at least one user notification was received or generated, method 1100 includes actuating the translation mechanism to translate the blade assembly from the retracted state to at least a partially extended state for one or more of: (i) preparing the flexible display to present the at least one user notification; and (ii) generating a physical indication that at least one user notification is available to be presented when the flexible display is active (block 1114). Then method 1100 ends.

In one or more embodiments, method 1100 further includes actuating the translation mechanism to translate the blade assembly from the retracted state to at least a partially extended state sufficient to present the at least one user notification. In one or more embodiments, method 1100 further includes presenting the at least one user notification on the flexible display in response to receiving an unlocking credential from the user.

With reference to FIG. 12, method 1200 includes actuating the translation mechanism to slide the blade assembly relative to the device housing of an electronic device from the retracted position to at least the partially extended position (block 1202). Being in at least the partially extended position is a precondition for aspects of method 1200 for determining when automatic retraction is triggered. Method 1200 includes monitoring for a locking trigger among one or more of: (i) a user input to lock the electronic device; or (ii) an expiration of a locking period of time without user interaction (block 1204). Method 1200 includes determining whether the locking trigger has occurred (decision block 1206). In response to determining that the locking trigger has not occurred, method 1200 returns to block 1204. In response to determining that the locking trigger has occurred, method 1200 includes locking and/or inactivating the electronic device (block 1208). Method 1200 includes monitoring an on-body proximity sensor of at least one sensor for the electronic device for an indication that the electronic device is in the contextual state of being stowed on-body of the user (block 1210). Method 1200 includes determining whether the electronic device is in the contextual state of being stowed on the body of the user (decision block 1212). In response to determining that the electronic device is not stowed on the body of the user, method 1200 returns to block 1210. In one or more embodiments, the electronic device configured with the on-body proximity sensor is configured to distinguish between the electronic device being stowed as compared to being held. In an example, the electronic device may also include an ambient light sensor that detects a sudden decrease in ambient light that corresponds to proximity to the body of the user. In an additional example, the inactivation or locking of the electronic device may occur after a period of inactivity after stowing the electronic device. This period of inactivity while in proximity to the user may distinguish the contextual state of the electronic device being held from being stowed. In a further example, grip sensor or edge touch screen displays may detect the electronic device being held to distinguish from the state of the electronic device being stowed. In yet an additional example, the on-body proximity sensor may be able to distinguish a difference between being stowed in a pocket against the body from being held in hand, based on the difference in proximate body mass. The change in impedance experienced by the on-body proximity sensor may distinguish. Returning to FIG. 12, in response to determining that the electronic device is stowed on the body of the user, method 1200 includes actuating the translation mechanism to translate the blade assembly to the retracted position (block 1214). Then method 1200 ends.

With reference to FIG. 13, method 1300 includes actuating the translation mechanism to slide the blade assembly relative to the device housing of an electronic device from the retracted position to at least the partially extended position (block 1302). Being in at least the partially extended position is a precondition for aspects of method 1300 for determining when automatic retraction is triggered. Method 1200 includes monitoring a motion sensor of at least one sensor for detecting a contextual state of the device of being stationary or moving (block 1304). In one or more embodiments, method 1300 further includes determining whether the electronic device is stationary (decision block 1306). In one or more embodiments, determining that the electronic device is stationary may, by itself, be sufficient for determining that the electronic device is unattended, prompting automatic retraction of the blade assembly when the flexible display is inactivated or locked. Returning to FIG. 13, in one or more embodiments, in response to determining that the electronic device is stationary, method 1300 includes monitoring an eye gaze sensor of the at least one sensor to detect an eye gaze direction of the user (block 1308). In one or more embodiments, the electronic device includes front and back image capturing devices or cameras that provide images for eye gaze direction. In one or more embodiments, the electronic device includes orientation sensors to assist identifying available image capturing devices that are oriented upwardly or horizontally toward a user. Method 1300 includes determining whether the eye gaze direction is detected as being toward the electronic device (decision block 1310). In response to determining that the eye gaze direction is detected as being toward the electronic device, method 1300 returns to block 1308. In response to determining that the eye gaze direction is not detected as being toward the electronic device during the locking period of time, method 1300 includes inactivating/locking the electronic device (block 1312). Method 1300 includes actuating the translation mechanism to translate the blade assembly from at least the partially extended state to the retracted state (block 1314). Then method 1300 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a". "an" and "the" are intended to include the plural forms as well, unless the context clearly indicates otherwise. It will be further understood that the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
a device housing;
a blade assembly carrying a blade and a flexible display and slidably coupled to the device housing;
a translation mechanism operable to slide the blade assembly relative to the device housing between an extended position and a retracted position;
at least one sensor configured to detect a contextual state of the electronic device from among one or more of: (i) stowed on-body of a user; (ii) stationary and unattended by the user; (iii) stationary and attended by the user; and (iv) held by the user; and
a controller communicatively coupled to the blade assembly, the translation mechanisms, and the at least one sensor, and which:
while the blade assembly is in a retracted position, determines whether a user notification opportunity exists based on a transition between contextual states of one of: (i) stationary and changing from unattended to attended by the user; and (ii) stowed on-body of the user changing to held by the user;
in response to determining that the user notification opportunity exists, determines whether at least one user notification is generated or received while the blade assembly was in the retracted state; and
actuates the translation mechanism to translate the blade assembly from the retracted state to at least a partially extended state for one or more of: (i) preparing the flexible display to present the at least one user notification; and (ii) generating a physical indication that at least one user notification is available to be presented when the flexible display is active.

2. The electronic device of claim 1, wherein the at least one sensor comprises an on-body proximity sensor, and the controller determines that the electronic device is the contextual state of being stowed on-body of the user based on detecting, via the on-body proximity sensor, proximity to the user while the flexible display is inactivated.

3. The electronic device of claim 2, wherein the controller actuates the translation mechanism to translate the blade assembly to the retracted position in response to determining that the electronic device is in the on-body stowed position while the blade assembly is at least partially in the extended position.

4. The electronic device of claim 1, wherein the at least one sensor comprises a motion sensor, and the controller:
determines the contextual state of being stationary and unattended based on the motion sensor indicating that the electronic device is stationary; and
determines the contextual state of being attended based on the motion sensor indicating that the electronic device is moving.

5. The electronic device of claim 4, wherein the controller actuates the translation mechanism to translate the blade assembly from at least the partially extended state to the retracted state in response to determining a change in the contextual state of attended based on moving to unattended to based on being stationary.

6. The electronic device of claim 1, wherein the at least one sensor comprises an eye gaze sensor, and the controller:
determines the contextual state of being stationary and unattended based on the eye gaze sensor not detecting an eye gaze direction of the user toward the electronic device; and
determines the contextual state of being stationary and attended based on the eye gaze sensor detecting an eye gaze direction of the user toward the electronic device.

7. The electronic device of claim 6, wherein the controller actuates the translation mechanism to translate the blade assembly from at least the partially extended state to the retracted state in response to determining a change in the contextual state of attended based on eye gaze direction toward the electronic device to unattended to based on not detecting an eye gaze direction of the user toward the electronic device for a period of time.

8. The electronic device of claim 1, wherein the controller actuates the translation mechanism to translate the blade assembly from the retracted state to at least a partially extended state sufficient to present the at least one user notification.

9. The electronic device of claim 1, wherein:
the at least one user notification comprises a mobile terminated audio or video call request; and
the controller presents the at least one user notification on the flexible display in response to receiving an unlocking credential from the user.

10. A method comprising:
actuating a translation mechanism to slide a blade assembly relative to a device housing of an electronic device from at least a partially extended position to a retracted position, the blade assembly carrying a blade and a flexible display and slidably coupled to the device housing;
monitoring at least one sensor configured to detect a contextual state of the electronic device from among one or more of: (i) stowed on-body of a user; (ii) stationary and unattended by the user; (iii) stationary and attended by the user; and (iv) held by the user;
while the blade assembly is in a retracted position, determining whether a user notification opportunity exists based on a transition between contextual states of one of: (i) stationary and changing from unattended to attended by the user; and (ii) stowed on-body of the user changing to held by the user;
in response to determining that the user notification opportunity exists, determining whether at least one user notification is generated or received while the blade assembly was in the retracted state; and
actuating the translation mechanism to translate the blade assembly from the retracted state to at least a partially extended state for one or more of: (i) preparing the flexible display to present the at least one user notification; and (ii) generating a physical indication that at least one user notification is available to be presented when the flexible display is active.

11. The method of claim 10, further comprising determining that the electronic device is the contextual state of being stowed on-body of the user based on detecting, via an on-body proximity sensor of the at least one sensor, proximity to the user while the flexible display is inactivated.

12. The method of claim 11, further comprising actuating the translation mechanism to translate the blade assembly to the retracted position in response to determining that the electronic device is in the on-body stowed position while the blade assembly is at least partially in the extended position.

13. The method of claim 10, further comprising:
  determining the contextual state of being stationary and unattended based on a motion sensor of the at least one sensor indicating that the electronic device is stationary; and
  determines the contextual state of being stationary and attended based on the motion sensor indicating that the electronic device is moving.

14. The method of claim 13, further comprising actuating the translation mechanism to translate the blade assembly from at least the partially extended state to the retracted state in response to determining a change in the contextual state of attended based on moving to unattended to based on being stationary.

15. The method of claim 10, further comprising:
  determining the contextual state of being stationary and unattended based on an eye gaze sensor of the at least one sensor not detecting an eye gaze direction of the user toward the electronic device; and
  determining the contextual state of being stationary and attended based on the eye gaze sensor detecting an eye gaze direction of the user toward the electronic device.

16. The method of claim 15, further comprising actuating the translation mechanism to translate the blade assembly from at least the partially extended state to the retracted state in response to determining a change in the contextual state of attended based on eye gaze direction toward the electronic device to unattended to based on not detecting an eye gaze direction of the user toward the electronic device for a period of time.

17. The method of claim 10, further comprising actuating the translation mechanism to translate the blade assembly from the retracted state to at least a partially extended state sufficient to present the at least one user notification.

18. The method of claim 10, further comprising:
  identifying a user notification based on receiving a mobile terminated audio or video call request; and
  presenting the at least one user notification on the flexible display in response to receiving an unlocking credential from the user.

19. A computer program product comprising:
  a computer readable storage device; and
  program code on the computer readable storage device that when executed by a processor associated with an electronic device, the program code enables the electronic device to provide functionality of:
    actuating a translation mechanism to slide a blade assembly relative to a device housing of the electronic device from at least a partially extended position to a retracted position, the blade assembly carrying a blade and a flexible display and slidably coupled to the device housing;
    monitoring at least one sensor configured to detect a contextual state of the electronic device from among one or more of: (i) stowed on-body of a user; (ii) stationary and unattended by the user; (iii) stationary and attended by the user; and (iv) held by the user;
    while the blade assembly is in a retracted position, determining whether a user notification opportunity exists based on a transition between contextual states of one of: (i) stationary and changing from unattended to attended by the user; and (ii) stowed on-body of the user changing to held by the user;
    in response to determining that the user notification opportunity exists, determining whether at least one user notification is generated or received while the blade assembly was in the retracted state; and
    actuating the translation mechanism to translate the blade assembly from the retracted state to at least a partially extended state for one or more of: (i) preparing the flexible display to present the at least one user notification; and (ii) generating a physical indication that at least one user notification is available to be presented when the flexible display is active.

20. The computer program product of claim 19, wherein the program code enables the electronic device to provide functionality of:
  determining that the electronic device is the contextual state of being stowed on-body of the user based on detecting, via an on-body proximity sensor of the at least one sensor, proximity to the user while the flexible display is inactivated; and
  actuating the translation mechanism to translate the blade assembly to the retracted position in response to determining that the electronic device is in the on-body stowed position while the blade assembly is at least partially in the extended position.

* * * * *